United States Patent [19]

Schwärzler

[11] Patent Number: 5,419,741
[45] Date of Patent: May 30, 1995

[54] CONVOLUTED BOOT DEVICE

[75] Inventor: Peter Schwärzler, Glattbach, Germany

[73] Assignee: Lohr & Bromkamp GmbH, Offenbach/Main, Germany

[21] Appl. No.: 22,061

[22] Filed: Feb. 24, 1993

[30] Foreign Application Priority Data

Feb. 25, 1992 [DE] Germany .............. 42 05 678.0

[51] Int. Cl.⁶ .............................. F16D 3/84
[52] U.S. Cl. .............................. 464/175; 277/212 FB
[58] Field of Search .............. 464/173, 175; 277/212 FB, 100

[56] References Cited

U.S. PATENT DOCUMENTS

| | | | |
|---|---|---|---|
| 3,906,747 | 9/1975 | Oran | 464/175 X |
| 4,325,587 | 4/1982 | Seigert | 277/212 FB |
| 4,478,592 | 10/1984 | Krude et al. | 464/175 X |
| 4,605,332 | 8/1986 | Mayhew et al. | |
| 4,722,415 | 2/1988 | Takahashi | 277/212 FB |
| 4,877,258 | 10/1989 | Alt et al. | 277/212 FB |
| 5,236,394 | 8/1993 | Collins et al. | 277/212 FB |

FOREIGN PATENT DOCUMENTS

| | | |
|---|---|---|
| 2380475 | 8/1978 | France . |
| 2205798 | 1/1973 | Germany . |
| 2219213 | 10/1973 | Germany . |
| 3140542 | 4/1983 | Germany . |

Primary Examiner—Daniel P. Stodola
Assistant Examiner—Eileen A. Dunn
Attorney, Agent, or Firm—Harness, Dickey & Pierce

[57] ABSTRACT

A convoluted boot made of a resilient material has a first collar with a large diameter and a second collar with a smaller diameter. The collars are positioned on rotatable parts which are rotatable relative to one another in an articulatable and/or axially movable condition. Also, the boot has a guiding portion positioned between at least one first freely deformable and movable fold and at least one second freely deformable and movable fold. The guiding portion is angularly movably held on a guiding member connected to one of the rotatable parts. The guiding member, on its outside, is enveloped and defines a spherical face.

10 Claims, 6 Drawing Sheets

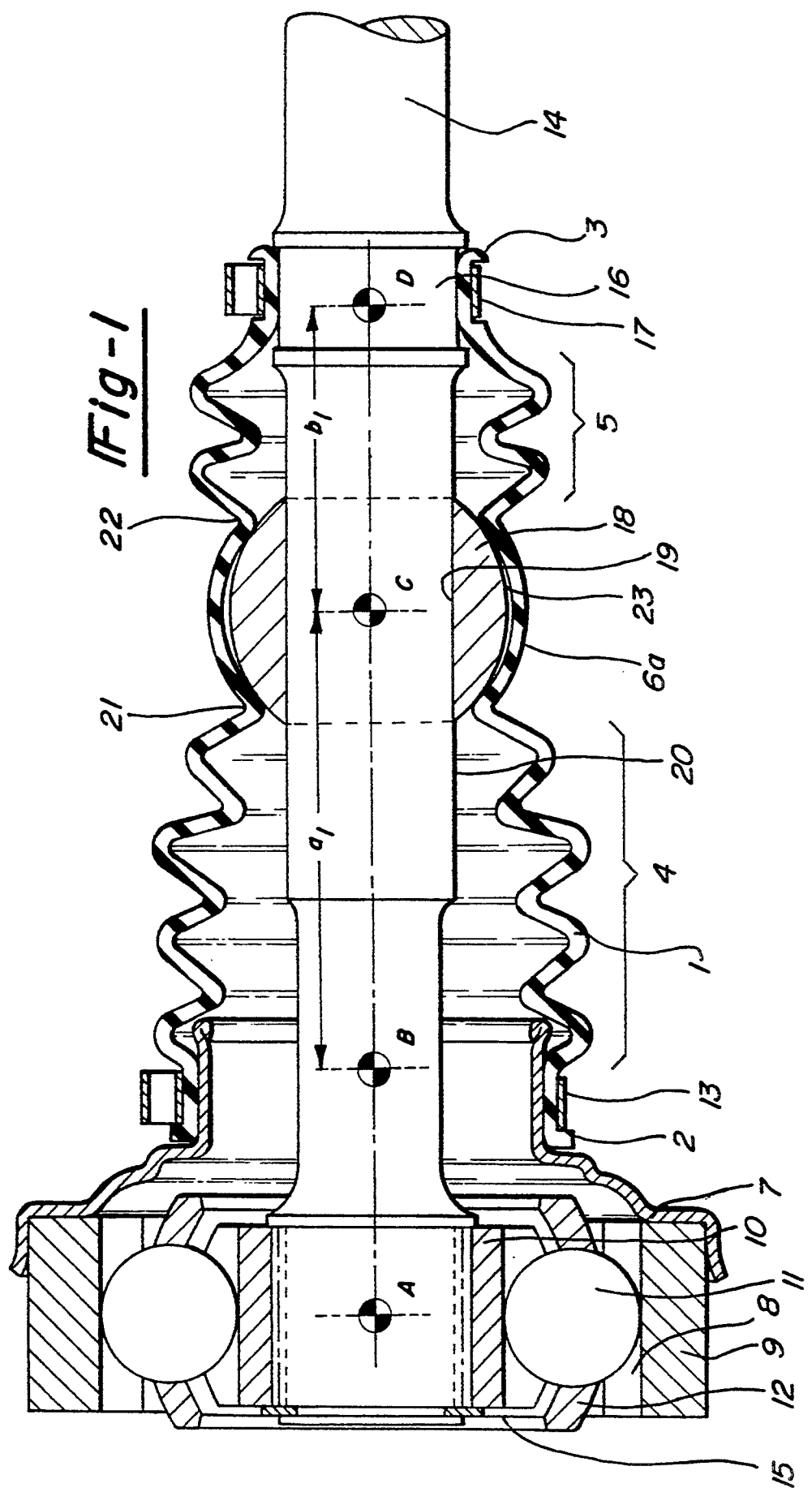

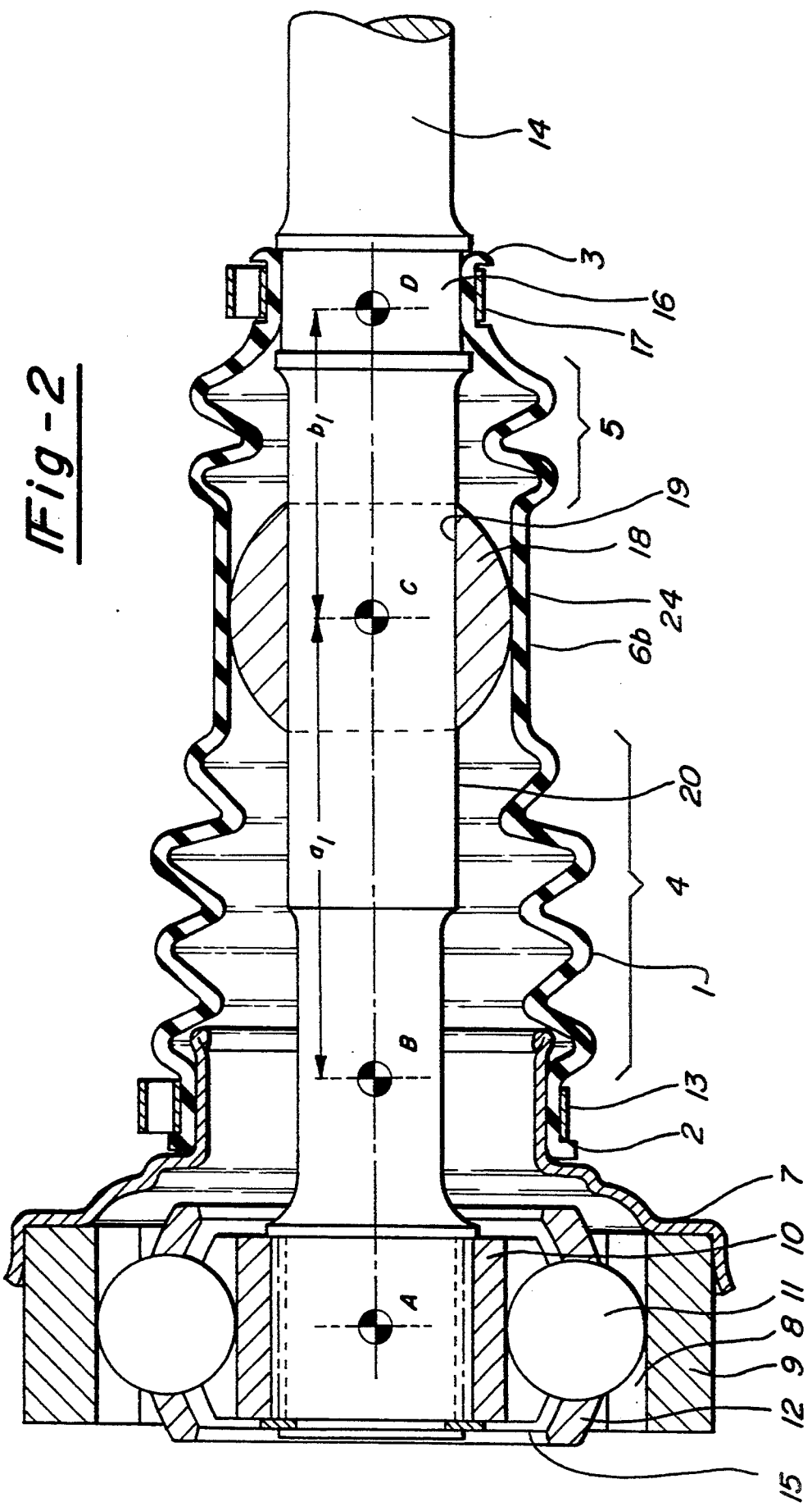

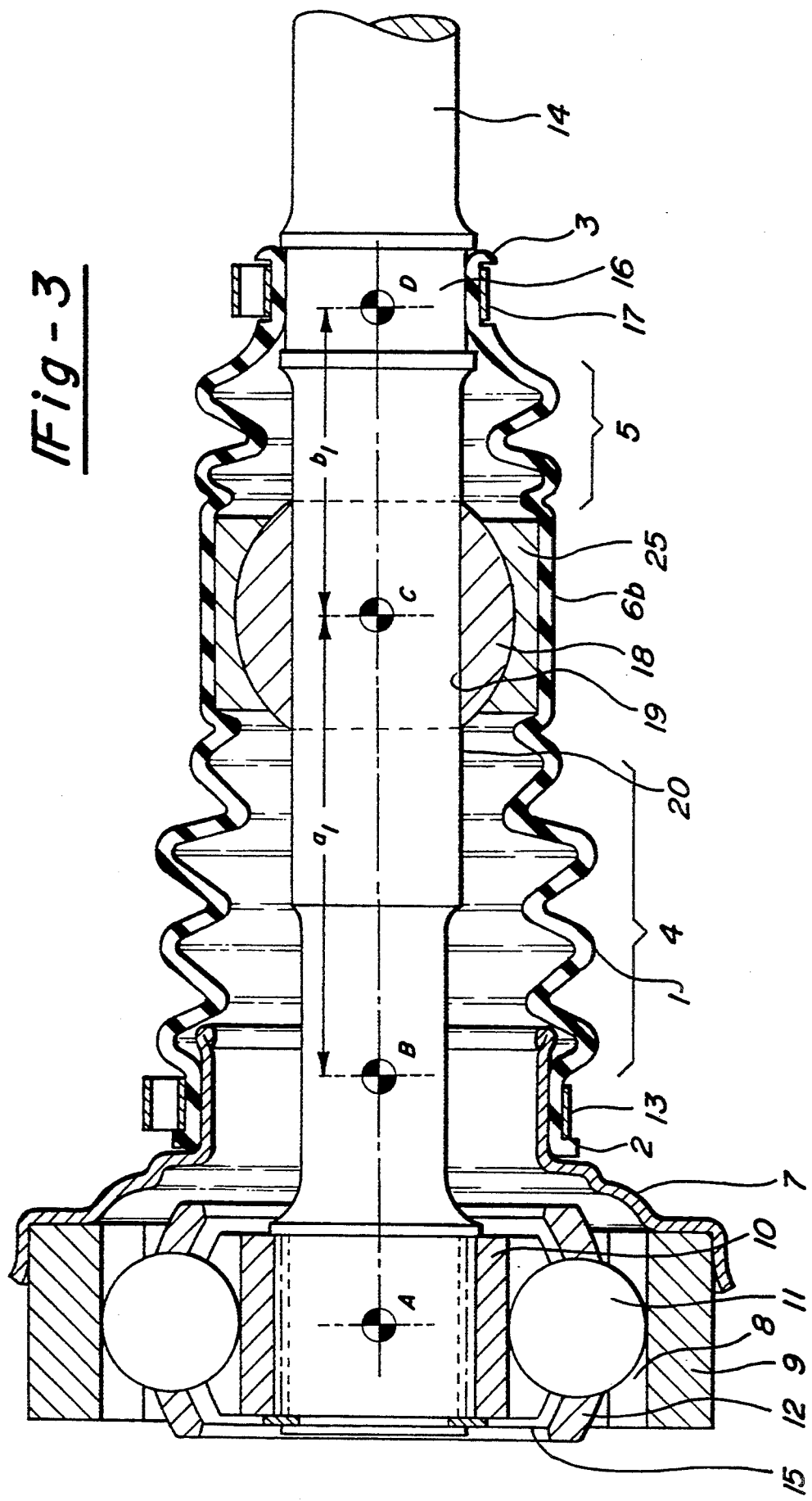

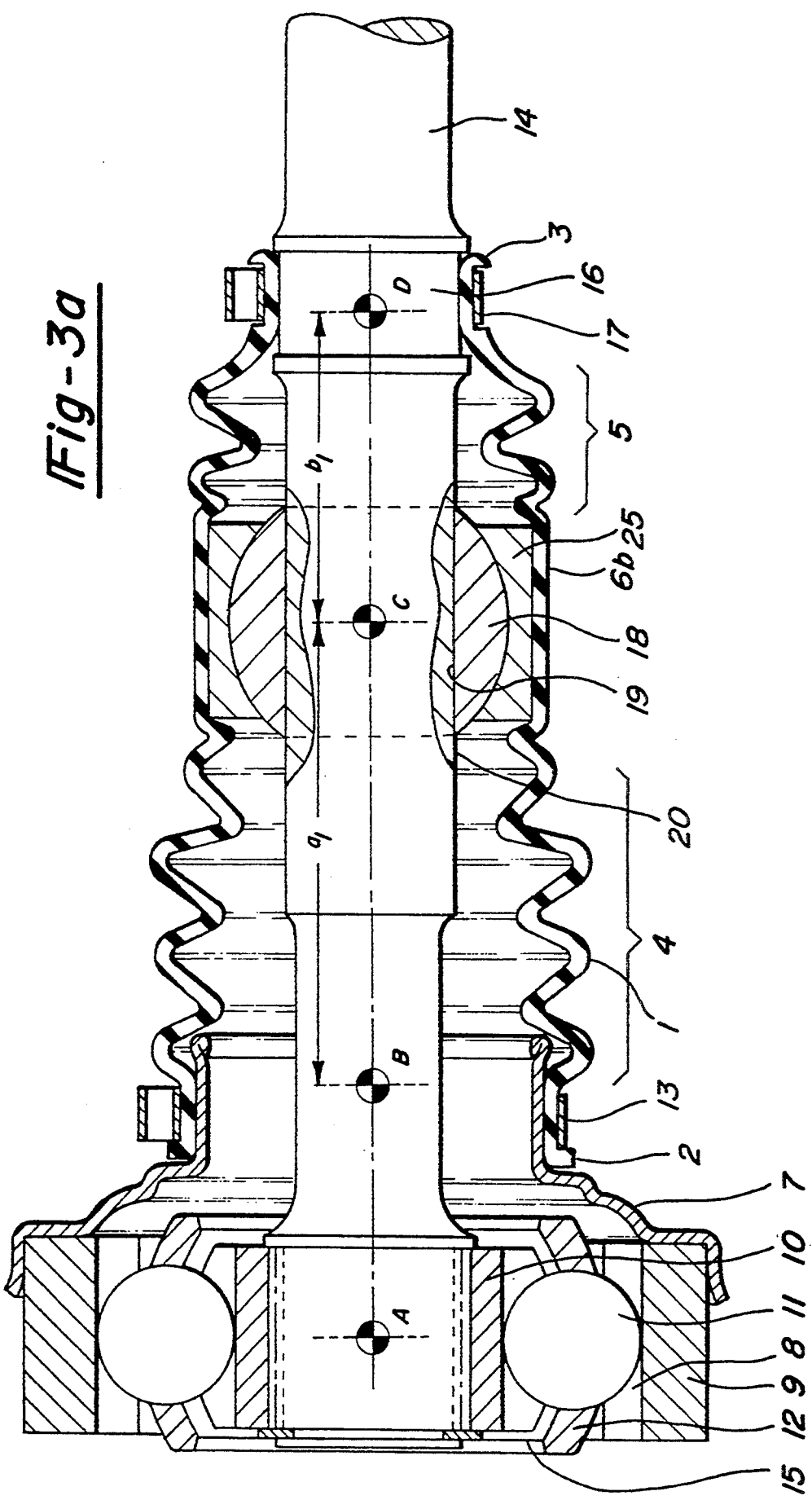

CONVOLUTED BOOT DEVICE

BACKGROUND OF THE INVENTION

The invention relates to a boot device comprising a convoluted boot and, more particularly, to a resilient boot with a first collar having a large diameter and a second collar having a smaller diameter. The collars are positioned on rotatable parts which are rotatable relative to one another in an articulatable and/or axially movable position. This type of boot is particularly suitable to seal constant velocity universal joints. The larger collar is secured to an outer joint part and the smaller collar is secured to a connecting shaft inserted into an inner joint part.

Convoluted boots are sensitive to chafing movements between the individual folds or between parts of the boot wall and fixed parts. Convoluted boots, especially those with long lengths, may be subject to deformation caused by centrifugal forces which occur during operation. Thus, the boots deviate from a statically assumed position which, in consequence and in addition, results in out-of-balance symptoms and chafing movements.

SUMMARY OF THE INVENTION

It is an object of the present invention to provide a convoluted boot device which accommodates centrifugal forces during operation without the risk of damage and wear.

The boot device of the invention includes a boot with a guiding portion which is positioned between at least one first freely deformable and movable fold and at least one second freely deformable and movable fold. The guiding portion is angularly movably held on a guiding member connected to one of the rotatable parts. The guiding member, on its outside face, is enveloped and defined by a geometrical sphere. The convoluted boot in accordance with the invention is "centered" by the guiding portion. The guiding portion is substantially centrally arranged to avoid any uncontrolled contact between the inner faces of the fold valleys and the rotatable parts. When the rotatable parts are articulated relative to one another, the convoluted boot may assume a naturally bent line which, with reference to the longitudinal axis, is approximately S-shaped. Further, even with larger angles between the parts, any contact is avoided between the outer surfaces of the folds.

The invention ensures that even larger amounts of deformation due entirely to the attack of centrifugal forces are avoided. This is particularly advantageous for convoluted boots made of a stiff material. These boots may be produced with greater lengths to achieve greater angles of articulation and longer plunging distances without putting them at risk due to centrifugal forces during operation. In a preferred design, the guiding portion is held on the guiding member so as to be angularly movable by at least 15° with respect thereto. With the guiding member having an external spherical design, the guiding portion in a first embodiment has a spherical portion internal shape. The guiding portion has a smaller axial spherical portion than the guiding member. In a second embodiment, the guiding portion has a cylindrical internal shape. Thus, the guiding portion may be articulated quite easily relative to the guiding member.

The guiding member may be axially secured on one of the rotatable parts, especially on the inserted shaft. However, in an advantageous embodiment, the guiding member is axially guided on the rotatable part. In the event the guiding member is guided on the inserted shaft, it is axially movable so that, upon articulation, the boot is able to more naturally self adjust with a uniform load being applied to the individual folds.

To reduce a wear-promoting friction between the guiding portion of the convoluted boot and the guiding member, the shape of one of the two parts may deviate from an exact spherical shape. Thus, if viewed in longitudinal section, a sickle-shaped gap is formed between the two parts. This design avoids jamming and the grease filling the gap may have a friction-reducing affect. To reduce or eliminate sliding friction between the guiding portion of the convoluted boot and the guiding member, it is possible to provide an internally spherical guiding sleeve which is angularly movably positioned on the guiding member. Also, the sleeve is moved along by the guiding portion of the convoluted boot. The sleeve is form-fitted or friction locked with the guiding portion. Thus, any sliding friction which takes place is exclusively between the guiding member and the guiding sleeve. Other embodiments of such support possibilities are conceivable for those versed in the art.

From the following detailed description taken in conjunction with the accompanying drawings and subjoined claims, other objects and advantages of the present invention will become apparent to those skilled in the art.

BRIEF DESCRIPTION OF THE DRAWINGS

A preferred embodiment of the invention will be described below with reference to the drawings wherein:

FIG. 1 is a longitudinal cross sectional view of a first embodiment of a convoluted boot in accordance with the present invention in an assembled condition on a constant velocity universal joint.

FIG. 2 is a longitudinal cross sectional view of a second embodiment of a convoluted boot in accordance with the present invention in an assembled condition on a constant velocity universal joint.

FIG. 3 is a longitudinal cross sectional view of a third embodiment of a convoluted boot in accordance with the present invention in an assembled condition on a constant velocity universal joint.

FIG. 3A is a longitudinal cross sectional view like FIG. 3 of another embodiment in accordance with the present invention.

DETAILED DESCRIPTION OF THE PREFERRED EMBODIMENTS

Figure 1A:
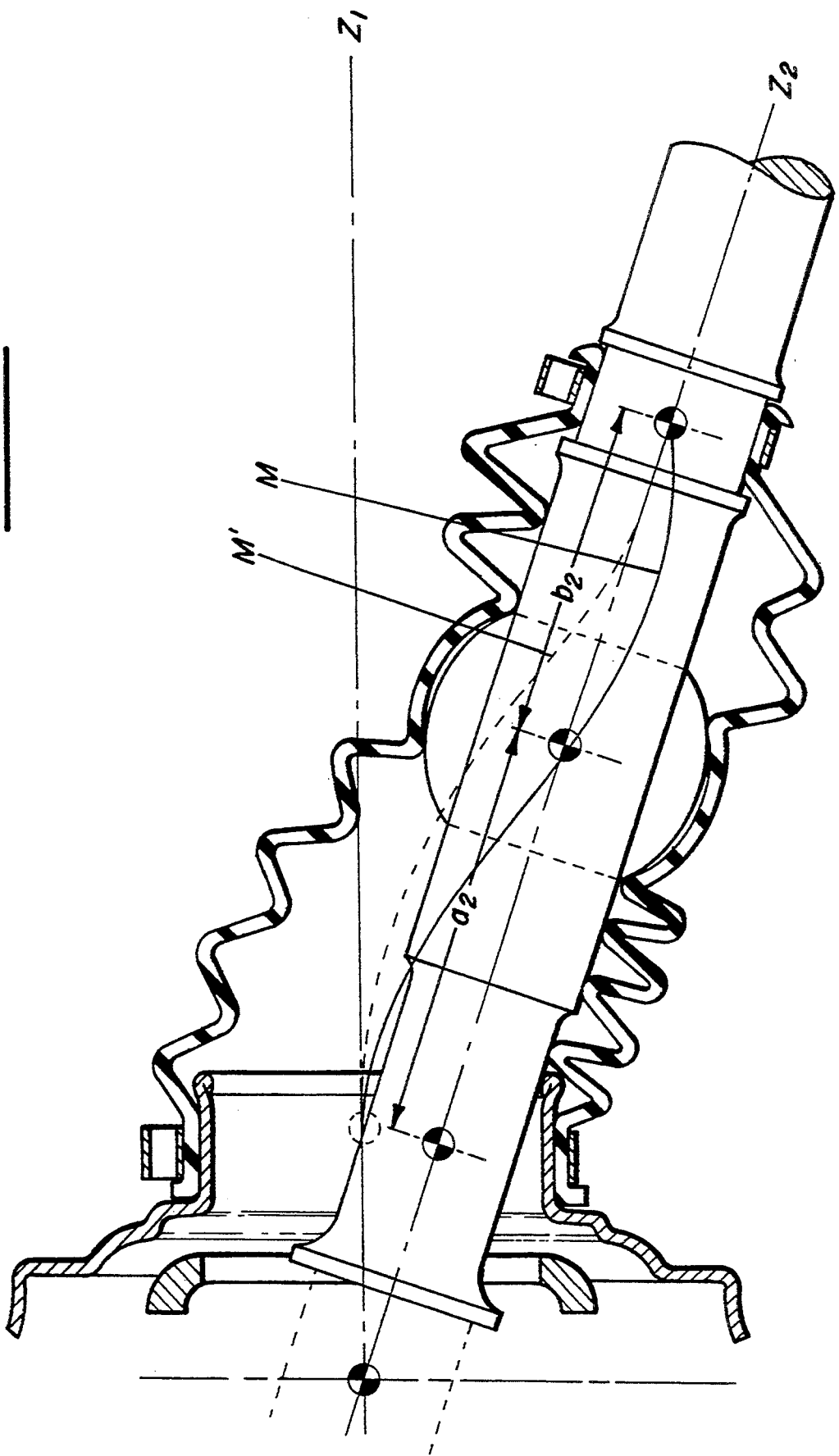
FIG. 1a is a view of a convoluted boot like FIG. 1 with the driving axle articulated relative to the constant velocity universal joint.

In the figures, which initially will be described jointly, identical parts are given the same reference numerals. In each case, a convoluted boot i is shown in accordance with the invention. The boot 1 has a first large collar 2 and a second smaller collar 3. A first group 4 of four complete folds is coupled with the larger collar 2. A second group 5 of two complete folds is coupled with the smaller collar 3. A guiding portion 6a, b is positioned between the two groups of folds.

The first collar 2 is indirectly, via a plate metal cap 7, connected to the outer joint part 9 of a constant velocity universal joint 8. The joint S includes an inner joint part 10, torque transmitting balls 11 and a cage 12 holding the balls in one plane. The collar 2 is secured to the plate metal cap 7 via a tensioning strip 13. A driveshaft 14 is inserted into the inner joint part 10 of the constant velocity universal joint 8 and axially connected via a securing ring 15. The second collar 3 of the convoluted boot 1 is secured to a stepped collar 16 of the driveshaft 14 via a tensioning strip 17.

The guiding portion 6a, b is held on a guiding member 18 so as to be angularly movable by at least 15° relatively thereto. The guiding member 18 has a substantially spherical external surface and, via an inner bore 19, is axially movable on a guiding portion 20 of the driveshaft 14.

In FIGS. 1 and 1a, the convoluted boot 1 is provided with a guiding portion 6a which has a substantially spherical shaped portion. The direct contact between the guiding portion 6a and the guiding member 18 takes place in two annular contact regions 21, 22. An annular gap 23 extends between the two contact regions 21, 22. The annular gap 23 is sickle-shaped when viewed in longitudinal section and may be filled with a lubricant.

Figure 2A:
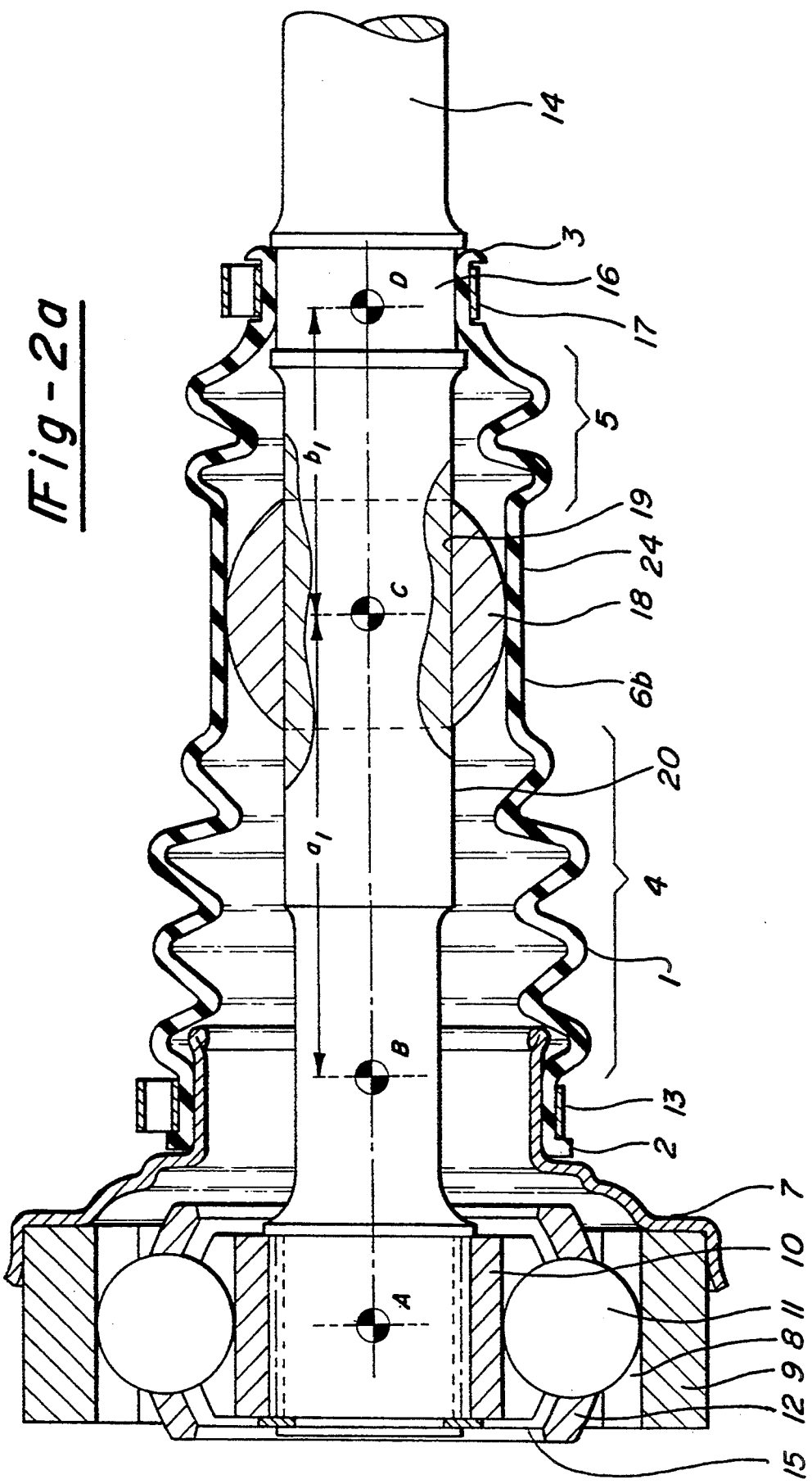
FIG. 2A is a longitudinal cross sectional view like that of FIG. 2 of another embodiment in accordance with the invention.

In FIG. 2, the convoluted boot is provided with a cylindrical guiding portion 6b. The direct contact between the guiding portion 6b and the guiding member 18 takes place in an annular contact region 24. The guiding portion is held on the guiding member so as to be angularly movable by at least 15° with respect thereto.

In FIG. 3 the convoluted boot is again provided with a cylindrical guiding portion 6b. An internally spherical guiding sleeve 25 is inserted between the guiding portion 6b and the guiding member 18. The sleeve 25 moves along by its form-fitting contact with the guiding portion 6b. The sleeve 25 slides articulatably relative to the guiding member 18. The guiding portion 6b at the convoluted boot and the guiding sleeve 25, on their contacting faces, may have different shapes adapted to one another without adversely affecting the functioning of the parts. For assembly purposes, the guiding sleeve 25 may be resilient, metallic or non-metallic, and slotted along its circumference or it may consist of two components divided longitudinally or transversely.

In FIGS. 1, 2 and 3 the shaft and outer joint part are arranged coaxially relative to one another. Points A, B, C and D refer to the points of intersection between the following planes and the axis of the driveshaft 14.

Point A is defined at a plane through the ball centers in the extended position. Point B is defined at a plane at the righthand edge of the tensioning strip 13 in the extended position. Point C is defined at a central plane of guiding member 18. Point D is defined at a plane at the lefthand edge of the tensioning strip 17 in the extended position. The distance $a_1$ is the axial distance between B and C. The distance $b_1$ is the axial distance between C and D.

In FIG. 1a the joint is shown to be broken away, and there exists a considerable angle between the axis $Z_1$ of the outer joint part and the axis $Z_2$ of the inner joint part and the driveshaft 14, respectively. As a result, the convoluted boot deforms to such an extent that its center line M becomes S-shaped. The center line is predetermined by the guidance of the guiding portion 6a on the guiding member 18. A dashed line referred to as M' is a center line of the convoluted boot which, under the influence of centrifugal forces, would occur and lead to undesirable friction between the inner folds and the driveshaft. As a result of the deformation of the boot, the center C of the guiding member 18 between the points B and D (remaining unchanged) has become displaced to such an extent that the distances $a_2$ and $b_2$ have decreased and increased, respectively, as compared to the original distances $_1$, $b_1$.

While the above detailed description describes the preferred embodiment of the present invention, the invention is susceptible to modification, variation, and alteration without deviating from the scope and fair meaning of the subjoined claims.

I claim:

1. A boot device for rotatable parts which are rotatable relative to one another in an articulatable and/or axially movable direction, comprising:

a one piece convoluted boot made of a resilient elastomeric material with a first collar with a large diameter and a second collar with a smaller diameter, said collars positioned on said rotatable parts such that said collars are axially fixably positioned on the rotatable parts;

a guiding portion positioned between said collars;

at least one first freely deformable and movable fold between said large diameter collar and said guiding portion;

at least one second freely deformable and movable fold between said smaller diameter collar and said guiding portion;

said guiding portion is adapted to be angularly movably held on a guiding member slidably connected to one of the rotatable parts, the guiding member having a face portion on its outside, being enveloped and defined by a geometrical sphere.

2. The convoluted boot according to claim 1, wherein the guiding portion is held on the guiding member so as to be angularly movable by at least 15° with respect thereto.

3. The convoluted boot according to claim 1, wherein the guiding member is axially movably arranged on one of the rotatable parts.

4. The convoluted boot according to claim 1, wherein the guiding member has an externally spherical surface.

5. The convoluted boot according to claim 4, wherein an annular gap is provided between the guiding portion and the guiding member, said gap being sickle-shaped in longitudinal section and extending between annular contact regions at both ends of the guiding portion opposite the guiding member.

6. The convoluted boot according to claim 1, wherein the guiding portion has an internally substantially spherical shaped portion.

7. The convoluted boot according to claim 1 wherein the guiding portion is internally cylindrical.

8. The convoluted boot according to claim 1, wherein a guiding sleeve is guided on the surface of the guiding member, said sleeve is angularly movable and is moved along by a form-fit or friction-lock between an inner face of the guiding portion and the guiding sleeve.

9. A convoluted boot for rotatable parts which are rotatable relative to one another in an articulatable and/or axially movable direction, comprising:

a one piece convoluted boot made of a resilient elastomeric material with a first collar with a large diameter and a second collar with a smaller diameter, said collars positioned on said rotatable parts such that said collars are axially fixably positioned on the rotatable parts;
a guiding portion positioned between said collars;
at least two first freely deformable and movable folds between said large diameter collar and said guiding portion;
at least two second freely deformable and movable folds between said smaller diameter collar and said guiding portion;
said guiding portion is angularly movably held on a guiding member which is axially rigidly arranged on one of the rotatable parts, the guiding member having a face portion on its outside, being enveloped and defined by a geometrical sphere.

10. The convoluted boot according to claim 9, wherein the guiding members is integrally formed with one of the rotatable parts.

* * * * *